US010428970B2

(12) United States Patent
Nieddu et al.

(10) Patent No.: US 10,428,970 B2
(45) Date of Patent: Oct. 1, 2019

(54) METHOD OF OPERATING A DIGITAL INLET VALVE

(71) Applicant: GM GLOBAL TECHNOLOGY OPERATIONS LLC, Detroit, MI (US)

(72) Inventors: Stefano Nieddu, Turin (IT); Andrea Mollar, La Loggia (IT); Tiziano Sorrentino, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/299,244

(22) Filed: Oct. 20, 2016

(65) Prior Publication Data

US 2017/0108139 A1 Apr. 20, 2017

(30) Foreign Application Priority Data

Oct. 20, 2015 (GB) .................................. 1518557.2

(51) Int. Cl.
| | |
|---|---|
| *F16K 31/06* | (2006.01) |
| *H02K 41/02* | (2006.01) |
| *H02K 3/04* | (2006.01) |
| *H02K 1/34* | (2006.01) |
| *H02P 6/00* | (2016.01) |
| *H02P 25/06* | (2016.01) |

(Continued)

(52) U.S. Cl.
CPC .......... *F16K 31/0675* (2013.01); *F02D 41/20* (2013.01); *F02D 41/222* (2013.01); *F02D 41/3845* (2013.01); *F02M 59/368* (2013.01); *H02K 1/34* (2013.01); *H02K 3/04* (2013.01); *H02K 41/02* (2013.01); *H02P 6/006* (2013.01); *H02P 25/06* (2013.01); *F02D 2041/2055* (2013.01); *F02D 2041/2058* (2013.01); *F02D 2041/224* (2013.01)

(58) Field of Classification Search
CPC . F16K 37/0041; F16K 31/0675; F02M 51/04; F02M 59/366; F02M 57/027; F02M 63/0225; F02M 2037/085; F02D 2041/2058; F02D 2041/2027; F02D 2041/2055; F02D 2041/2034; F02D 2041/2041; F02D 2041/2048
USPC ....................... 251/129.04; 123/499; 361/154
See application file for complete search history.

(56) References Cited

U.S. PATENT DOCUMENTS 5,975,053 A * 11/1999 Rodier .................... F02D 41/20
123/446
6,041,667 A 3/2000 Pischinger et al.

FOREIGN PATENT DOCUMENTS

| DE | 102011085277 A1 | 5/2013 |
| EP | 2942517 A1 | 11/2015 |

(Continued)

OTHER PUBLICATIONS

Great Britain Patent Office, Great Britain Search Report for Great Britain Application No. 1518557.2, dated Apr. 19, 2016.

*Primary Examiner* — Matthew W Jellett
(74) *Attorney, Agent, or Firm* — Lorenz & Kopf, LLP

(57) ABSTRACT

A circuit and a method for a digital inlet valve having a shutter moveable between a closed and an open position and actuated by a linear electromagnetic actuator including a movable needle located inside a coil winding connected to a power source by a first electronic switch. An electric current is supplied to the coil winding. A parameter indicative of a movement of the needle is monitored. The electric current supply is adjusted when the monitored parameter exceeds a predetermined value.

17 Claims, 8 Drawing Sheets

(51) Int. Cl.
*F02D 41/38* (2006.01)
*F02M 59/36* (2006.01)
*F02D 41/20* (2006.01)
*F02D 41/22* (2006.01)

(56) References Cited

FOREIGN PATENT DOCUMENTS

| | | |
|---|---|---|
| JP | 2001182593 A | 7/2001 |
| JP | 2012107531 A | 6/2012 |

\* cited by examiner

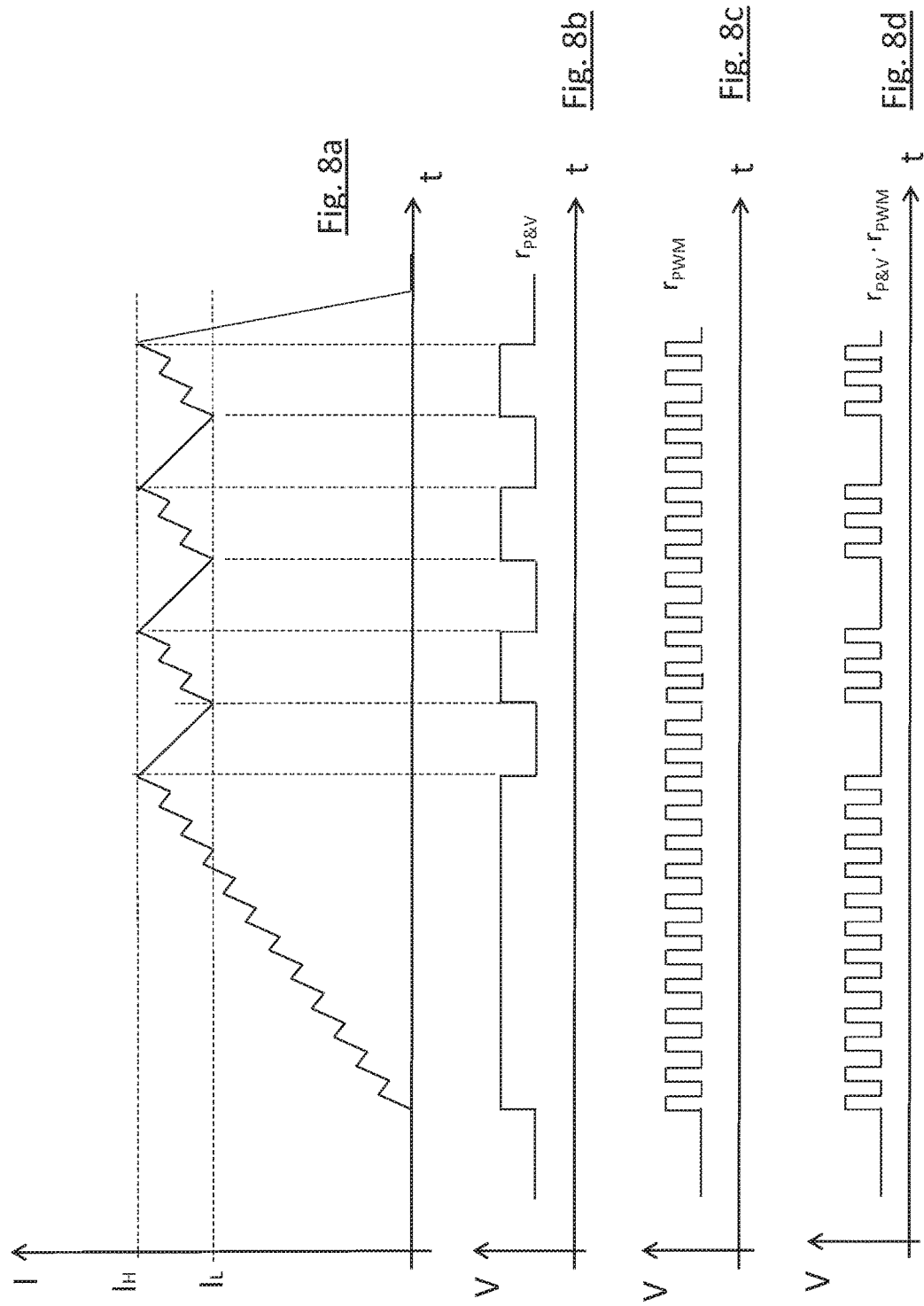

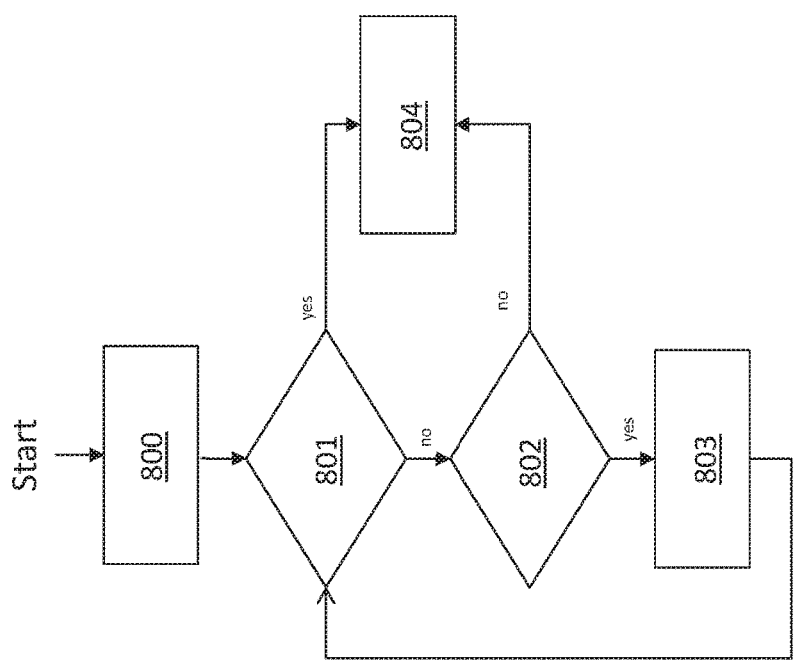

METHOD OF OPERATING A DIGITAL INLET VALVE

CROSS-REFERENCE TO RELATED APPLICATION

This application claims priority to Great Britain Patent Application No. 1518557.2, filed Oct. 20, 2015, which is incorporated herein by reference in its entirety.

TECHNICAL FIELD

The present disclosure pertains to a circuit and a method for operating a digital inlet valve associated to a high pressure pump provided in an internal combustion engine, in particular a diesel engine.

BACKGROUND

Conventional Diesel engines are provided with a fuel injection system which is configured to dispose in a combustion chamber of the engine a metered quantity of fuel. Fuel injection system includes a high pressure fuel pump, that increases the pressure of the fuel received from a low pressure pump in fluid communication with a fuel tank, and that delivers the fuel to a fuel rail in fluid communication with a fuel injector disposed within the combustion chamber of the engine. The high pressure pump is provided with a digital inlet valve for selectively admitting fuel to an inlet conduit of the high pressure pump.

A known digital inlet valve includes a shutter associated to a shutter seat provided in the inlet conduit of the high pressure pump. The shutter can translate from a closed to an open position in contrast with the action of a compression spring. The translation of the shutter is operated by a linear electromagnetic actuator, also known as linear solenoid, which includes a needle located inside a coil winding. The needle is biased by the action of a compression (return) spring towards a lower position, where it contacts the shutter keeping it in the open position.

When an electric current flows through the coil winding it generates a magnetic field that operates the translation of the needle in contrast to the return spring. In this way the needle departs from the shutter allowing the same to move in the closed position where it is received in the shutter seat, preventing the flowing of the fuel.

A drawback of the disclosed digital inlet valve is due to the noise generated during its operation. In detail the noise is due to the operation of the shutter and the needle during the closing and the opening phases of the inlet valve.

Accordingly, it is desirable to reduce the operating noise of the digital inlet valve with a simple, rational and rather inexpensive solution.

SUMMARY

An embodiment of the present disclosure provides for operating a digital inlet valve having a shutter, moveable between a closed and an open position, actuated by a linear electromagnetic actuator including a movable needle located inside a coil winding connected to a power source by a first electronic switch. An electric current is supplied to the coil winding. A parameter indicative of a movement of the needle is monitored. The electric current supply is adjusted when the monitored parameter exceeds a predetermined value. As a result, it is possible to regulate the translation speed of the needle and of shutter, slowing the translation speed near the end stops. A slow speed will reduce the noise generated by the impact of the needle or of the shutter against the end stops.

According to an aspect of the present disclosure, the parameter indicative of a movement of the needle is a conduction time interval of the first electronic switch. This aspect if the present disclosure provides a reliable and easy way to determine a movement of the needle.

According to an aspect of the present disclosure, adjustment of the electric current provides for interrupting the electric current supply, and connecting the coil winding to a dissipative bi-pole for discharging the electric current from the coil winding. This aspect of the present disclosure allows a faster slowing of the needle speed.

According to an aspect of the present disclosure, supplying of an electric current to the coil winding during a closing instant of the shutter provides for switching the first electronic switch for supplying to the winding an electric current having a value equal to the average value between predetermined low and high electric current values, and adjusting an electric current flowing through the winding and the predetermined low and high electric current values until a translation of the needle is detected during a predetermined open/close cycle of the first electronic switch. This aspect if the present disclosure has the advantage to reduce the translation speed of the needle so that the operating noise of the digital inlet valve is further reduced.

According to a further aspect of the present disclosure, if a translation of the needle is detected after the predetermined open/close cycle, adjusting of the electric current flowing through the winding and the predetermined low and high electric current values provides for increasing the electric current flowing through the winding and of the predetermined low and high electric current values of a predetermined quantity until the translation of the needle is detected during the predetermined open/close cycle. According to a further aspect of the present disclosure, if a translation of the needle is detected before the predetermined open/close cycle, adjusting of the electric current flowing through the winding and of the predetermined low and high electric current values provides for decreasing the electric current flowing through the winding and the predetermined low and high electric current values of a predetermined quantity until the translation of the needle is detected during the predetermined open/close cycle. Both these aspects of the present disclosure have the advantage to allow a regulation of the electric current flowing through the winding which keeps into account the production spreading and the aging of the spring.

According to an aspect of the present disclosure, the parameter indicative of a movement of the needle is an interdiction time of the electronic switch. This aspect if the present disclosure provides a reliable and easy way to determine a movement of the needle.

According to an aspect of the present disclosure, adjustment of the electric current provides for increasing the supplied electric current value. This aspect of the present disclosure allows a faster slowing down of the shutter speed.

According to an aspect of the present disclosure, supplying of an electric current to the coil winding, during an opening instant of the shutter, provides for activating a switching of the first electronic switch, for supplying to the winding an electric current having a value equal to the average value between predetermined low and high electric current values, monitoring the interdiction time during a predetermined number of open/close cycles of the first electronic switch, storing a maximum value of the interdiction time among those monitored, and adjusting an electric current flowing through the winding and the predetermined low and high electric current values, until the maximum value of the interdiction time is equal than a predetermined reference value. This aspect if the present disclosure has the advantage to reduce the translation speed of the needle so that the operating noise of the digital inlet valve is further reduced.

According to a further aspect of the present disclosure, if the maximum value of the interdiction time is greater than the reference predetermined value, adjusting of an electric current flowing through the winding and the predetermined low and high electric current values provides for increasing the electric current flowing through the winding of a predetermined quantity until the maximum value of the interdiction time is equal than the reference predetermined value. According to a further aspect of the present disclosure, if the maximum value of the interdiction time is smaller than the reference predetermined value, adjusting of an electric current flowing through the winding and the predetermined low and high electric current values provides for decreasing the electric current flowing through the winding of a predetermined quantity until the maximum value of the interdiction time is equal than the reference predetermined value. Both these last aspects of the present disclosure have the advantage to allow a regulation of the electric current flowing through the winding which keeps into account the production spreading and the aging of the spring.

According to an aspect of the present disclosure, supplying of an electric current to the coil winding provides for setting a first and a second electric current values supplying to the coil winding the second electric current value by switching the first electronic switch, monitoring a translation of the needle, reducing the second electric current value of a predetermined quantity if no translation of the needle is detected, and repeating these steps until a translation of the needle is detected or the reduced second electric current value is less than the first electric current value. This aspect if the present disclosure has the advantage to reduce the translation speed of the needle so that the operating noise of the digital inlet valve is further reduced.

According to another aspect of the present disclosure, supplying of an electric current to the coil winding provides for switching the electronic switch by a peak and valley control signal.

According to a further aspect of the present disclosure, supplying of an electric current to the coil winding provides for switching the electronic switch by superimposing a power width modulation signal to a peak and valley control signal. This solution allows a more precise control on the translation speed of the needle, consequently the impact noise, caused by the impact of the needle against the upper end stop, is further reduced.

A different embodiment of the present disclosure provides for a digital inlet valve including a shutter, moveable between a closed and an open position, a linear electromagnetic actuator for actuating the shutter including a movable needle located inside a coil winding having a first and a second end terminal, and a control circuit connected to the first and the second end terminals including a first, a second and a third electronic switches. The first end terminal is electrically connected to a power source by the first electronic switch, and to a ground pole by the second electronic switch. The second end terminal is electrically connected to the third electronic switch, which can switches in three different position. In a first position the second end terminal is directly connected to the ground pole. In a second position the second end terminal is connected to the ground pole by a dissipative bi-pole. In a third position the second end terminal is not connected to the ground pole, and the first and third electronic switches are connected to an electronic control unit configured to command the first electronic switch to an open position disconnecting the electric power source and to command the third electronic switch in the second position when a conduction time of the first electronic switch exceeds a predetermined value. This embodiment has the advantage to provide a reliable and cheap control circuit.

According to an aspect of the present disclosure, the shutter and the needle are made in a single body. This aspect of the present disclosure is an economic alternative to the previous embodiment.

A different embodiment of the present disclosure provides for a high pressure pump for supplying fuel to a rail of an internal combustion engine including a digital inlet valve according to the previous aspects of the present disclosure.

Another embodiment of the present disclosure provides an apparatus for operating a digital inlet valve provided with a shutter, moveable between a closed and an open position, actuated by a linear electromagnetic actuator including a movable needle located inside a coil winding connected to a power source by a first electronic switch. The apparatus is configured to supply an electric current to the coil winding, monitor a parameter indicative of a movement of the needle, and adjust the electric current supply when the monitored parameter exceeds a predetermined value. The apparatus may be configured such that the parameter indicative of a movement of the needle is a conduction time of the first electronic switch.

In another embodiment the apparatus is configured to adjust the electric current by interrupting the electric current supply, and connecting the coil winding to a dissipative bi-pole for discharging the electric current from the coil winding.

The apparatus can be configured to supply an electric current to the coil winding during a closing instant of the shutter by activating a switching of the first electronic switch, for supplying to the winding an electric current having a value equal to the average value between predetermined low and high electric current values, and adjusting an electric current flowing through the winding and the predetermined low and high electric current values until a translation of the needle is detected during a predetermined open/close cycle of the first electronic switch.

The apparatus can be configured to supply an electric current to the coil winding during a closing instant of the shutter by activating a switching of the first electronic switch, for supplying to the winding an electric current having a value equal to the average value between predetermined low and high electric current values, and adjusting an electric current flowing through the winding and the predetermined low and high electric current values $I_L$, $I_H$ until a translation of the needle is detected during a predetermined open/close cycle of the first electronic switch.

Furthermore, in an embodiment of the apparatus may be configured to supply an electric current to the coil winding during a closing instant of the shutter by activating a switching of the first electronic switch, for supplying to the winding an electric current having a value equal to the average value between predetermined low and high electric current values, and adjusting an electric current flowing through the winding and the predetermined low and high electric current values until a translation of the needle is detected during a predetermined open/close cycle of the first electronic switch.

In another embodiment the apparatus is configured to adjust the electric current flowing through the winding and the predetermined low and high electric current values if a translation of the needle is detected after the predetermined open/close cycle by increasing the electric current flowing through the winding and the predetermined low and high electric current values of a predetermined quantity until the translation of the needle is detected during the predetermined open/close cycle.

The apparatus can further be configured to adjust the electric current flowing through the winding and the predetermined low and high electric current values if a translation of the needle is detected before the predetermined open/close cycle by decreasing the electric current flowing through the winding and the predetermined low and high electric current values of a predetermined quantity until the translation of the needle is detected during the predetermined open/close cycle.

In an embodiment the parameter indicative of a movement of the needle is an interdiction time of the first electronic switch.

The apparatus can be configured such that the adjustment of the electric current provides for increasing the supplied electric current value.

In an embodiment, the apparatus may be configured to supply of an electric current to the coil winding, during an opening instant of the shutter by switching of the first electronic switch, for supplying to the winding an electric current having a value equal to the average value between predetermined low and high electric current values, monitoring the interdiction time during a predetermined number of open/close cycles of the first electronic switch, storing a maximum value of the interdiction time among those monitored, and adjusting an electric current flowing through the winding and the predetermined low and high electric current values until the maximum value of the interdiction time is equal than a predetermined reference value.

In another embodiment, the apparatus is configured to adjust an electric current flowing through the winding and the predetermined low and high electric current values if the maximum value of the interdiction time is greater than the reference predetermined value, by increasing the electric current flowing through the winding of a predetermined quantity until the maximum value of the interdiction time is equal than the reference predetermined value.

In another embodiment, the apparatus is configured to adjust an electric current flowing through the winding and the predetermined low and high electric current values if the maximum value of the interdiction time is smaller than the reference predetermined value by decreasing the electric current flowing through the winding of a predetermined quantity until the maximum value of the interdiction time is equal than the reference predetermined value.

In another configuration of the apparatus is configured to supply an electric current to the coil winding by setting a first and a second electric current values, and supplying to the coil winding the second electric current value by switching the first electronic switch, monitoring a translation of the needle, reducing the second electric current value of a predetermined quantity if no translation of the needle is detected, and repeating these steps until a translation of the needle is detected or the reduced second electric current value is less than the first electric current value.

A further embodiment, the apparatus is configured to supply an electric current to the coil winding by switching the electronic switch by a peak and valley control signal. In another embodiment, the apparatus is configured to supply an electric current to the coil winding by switching the electronic switch by superimposing a power with modulation signal to the peak and valley control signal.

The method of the present disclosure can be carried out with the help of a computer program including a program-code for carrying out all the steps of the method described above, and in the form of a computer program product including the computer program. The method can be also embodied as electromagnetic signals, the signal being modulated to carry a sequence of data bits which represent a computer program to carry out all steps of the method.

BRIEF DESCRIPTION OF THE DRAWINGS

The present disclosure will hereinafter be described in conjunction with the following drawing figures, wherein like numerals denote like elements.

FIGS. 8a, 8b,8c, 8d shows the variation over time of some signals used in an embodiment present disclosure;

FIG. 9 is a flowchart representing in details an aspect of an embodiment of a method of operating a digital inlet valve;

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
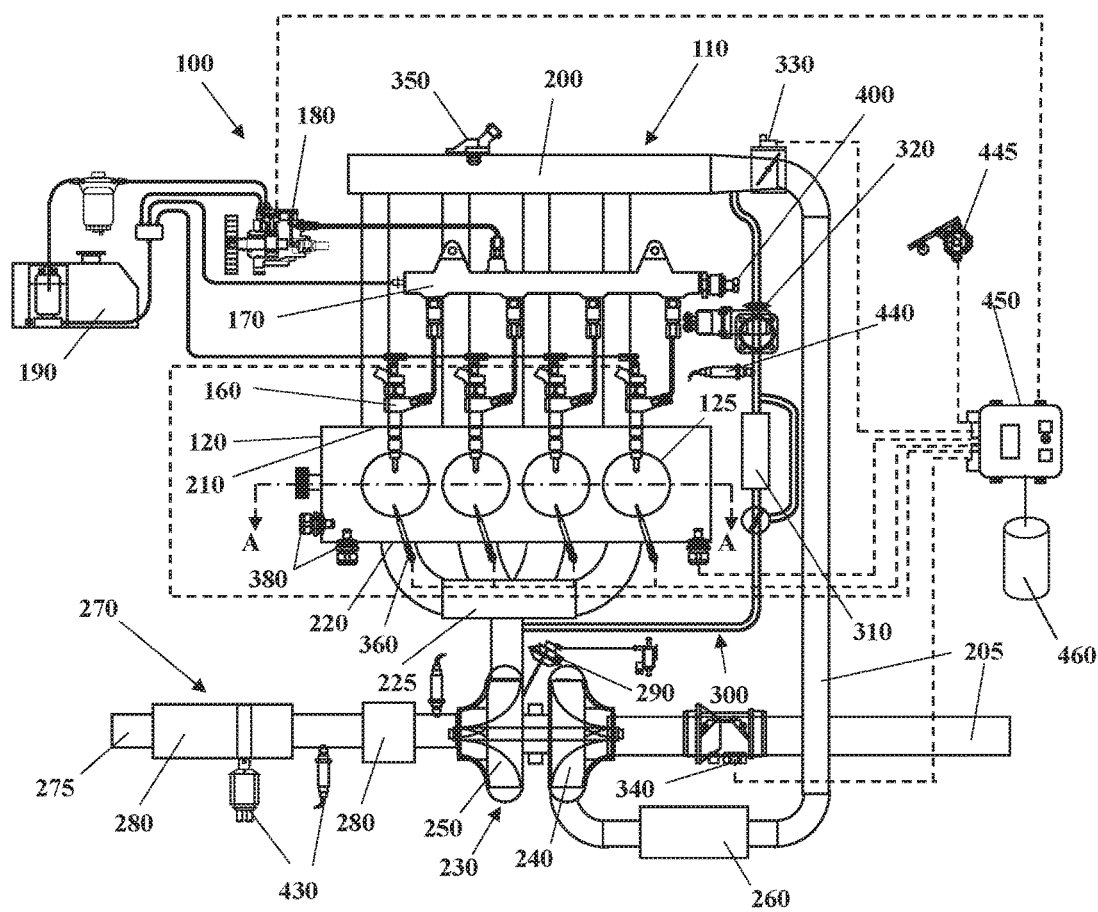
FIG. 1 schematically shows an automotive system belonging to a motor vehicle.
Figure 2:
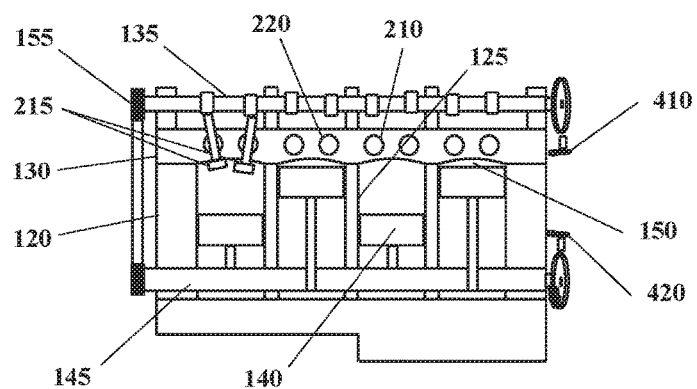
FIG. 2 is the section A-A of an internal combustion engine belonging to the automotive system of FIG. 1.

Some embodiments may include an automotive system 100, as shown in FIGS. 1 and 2, that includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150.

A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received from a fuel source 190. Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

In the combustion chamber 150 is located a glow plug 360 which is a heating element which is electrically activated for cold starting of the engine and also for improving the combustion performance within the combustion chamber.

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. This example shows a variable geometry turbine (VGT) with a VGT actuator 290 arranged to move the vanes to alter the flow of the exhaust gases through the turbine 250. In other embodiments, the turbocharger 230 may be fixed geometry and/or include a waste gate.

The exhaust gases exit the turbine 250 and are directed into an exhaust system 270. The exhaust system 270 may include an exhaust pipe 275 having one or more exhaust aftertreatment devices 280. The aftertreatment devices may be any device configured to change the composition of the exhaust gases. Some examples of aftertreatment devices 280 include, but are not limited to, catalytic converters (two and three way), oxidation catalysts, lean NOx traps, hydrocarbon adsorbers, selective catalytic reduction (SCR) systems, and particulate filters. Other embodiments may include an exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor that may be integral within the glow plugs 360, coolant and oil temperature and level sensors 380, a fuel rail pressure sensor 400, a cam position sensor 410, a crank position sensor 420, exhaust pressure and temperature sensors 430, an EGR temperature sensor 440, and an accelerator pedal position sensor 445. Furthermore, the ECU 450 may generate output signals to various control devices that are arranged to control the operation of the ICE 110, including, but not limited to, the fuel injectors 160, the throttle body 330, the EGR Valve 320, the VGT actuator 290, and cam phaser 155 and the glow plug 360. Note, dashed lines are used to indicate communication between the ECU 450 and the various sensors and devices, but some are omitted for clarity.

Turning now to the ECU 450, this apparatus may include a digital central processing unit (CPU) in communication with a memory system and an interface bus. The CPU is configured to execute instructions stored as a program in the memory system 460, and send and receive signals to/from the interface bus. The memory system 460 may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carryout out the steps of such methods and control the ICE 110.

The program stored in the memory system 460 is transmitted from outside via a cable or in a wireless fashion. Outside the automotive system 100 it is normally visible as a computer program product, which is also called computer readable medium or machine readable medium in the art, and which should be understood to be a computer program code residing on a carrier, the carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing the computer program code is impressed on the transitory electromagnetic signal. Such signals are e.g. made use of when transmitting computer program code in a wireless fashion via a WiFi connection to a laptop.

In case of a non-transitory computer program product the computer program code is embodied in a tangible computer-readable storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

The high pressure pump 180 (FIG. 3) includes, inside a cylinder 181, a plunger 182 which can translate in an axial direction being actuated by a cam 183. According to this embodiment of the present disclosure the cam 183 is associated to the camshaft 135 rotating in time with the crankshaft 145. A cylinder head 184 cooperates with the cylinder 181 and the plunger 182 to define a fuel pumping chamber 185 provided with a fuel inlet 186, located in the cylinder head 184, and a fuel outlet 187, located on the cylinder 181. The fuel inlet 186 is in fluid communication with the fuel source 190 and the fuel outlet 187 is fluid communication with the fuel rail 170. A digital inlet valve 500 cooperates with the high pressure pump 180 for supplying fuel inside the pumping chamber 185.

The digital inlet valve 500 includes a shutter 505 associated to a shutter seat 188, provided in cylinder head 184, and in fluid communication with the inlet conduit 186 of the high pressure pump 180. The shutter 505 is provided with a shaft 510 received in a central bore 515 located in a bottom wall 520 of a valve housing 525. The shutter 505 can axially translate between a closed position, wherein it is received in the shutter seat 188 preventing fuel flowing, and an open position, wherein it is spaced apart from the shutter seat 188, allowing the fuel flowing.

The axial translation of the shutter 505, from the closed to the open position, is operated by a linear electromagnetic actuator 530, also known as linear solenoid, in contrast with the action of a first compression spring 535 associated to the shaft 510. In detail the first compression spring 535 acts between the bottom wall 520 and a spring guide 536 connected to the shaft 510. The linear electromagnetic actuator 530 is placed inside the valve housing 525 and it includes a needle 540, located inside a coil winding 545 that can translate in contrast to the action of a second compression spring 550. According to the present embodiment of the present disclosure the second compression spring 550 is inserted externally and coaxially on the needle 540 and it acts between a support body 555 of the coil winding 545 and a spring guide 560 connected to the needle 540. Furthermore the valve housing 525 is provided with a valve fuel inlet 565 in fluid communication with the fuel inlet 186 on the cylinder head 184.

Figure 7:
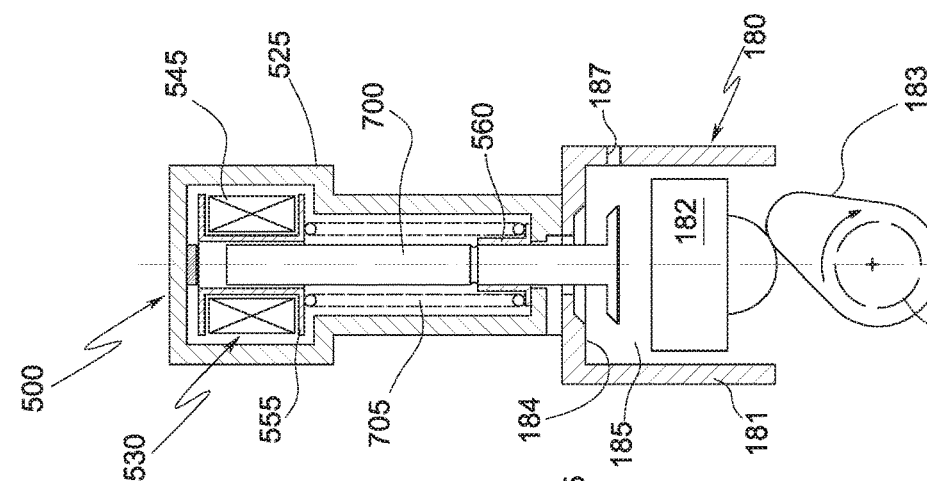
FIG. 7 is a schematic section, according a vertical plane, of a high pressure pump and a digital inlet valve in different operating positions of a different embodiment of the present disclosure.

A second embodiment of the present disclosure provides that the shutter 505 and the needle 540 are made in a single body 700 as shown in FIG. 7, wherein the same reference numbers have been used to indicate identical components already disclosed in the previous embodiment of the present disclosure. This second embodiment provides only a compression spring 705 inserted externally and coaxially on the needle 540 and acting between a support body 555 of the coil windings 545 and a spring guide 560 connected to the needle 540.

The digital inlet valve 500 includes also a control circuit 600 of the linear actuator 530 which is connected to a first and a second end terminal 575, 580 of the coil winding 545. The control circuit 600 includes a first and a second electronic switch 610 and 620 electrically connected to a first end terminal 575 of the coil winding 545, and a third electronic switch 630 electrically connected a the second end terminal 580 of the coil winding 545.

In detail, the first end terminal 575 is electrically connected to a power source 605 by the first electronic switch 610, and to a ground pole 640 by the second electronic switch 620, while the second end terminal 530 is connected to the third electronic switch 630. The first electronic switch 610 can switch between a closed position, wherein the first end terminal 575 is electrically connected to the power source 605, and an open position. The first end terminal 575 is not electrically connected to the power source 605. The third electronic switch 630 can switch in three different position, a first position 630a wherein the second end terminal 580 is directly connected to the ground pole 640, a second position 630b, wherein the second end terminal is connected to the ground pole 640 by a dissipative bi-pole 650, and a third position 630c, wherein the second end terminal 580 is not connected to the ground pole 640.

According to an embodiment of the present disclosure, the first and the third electronic switches 610,630 are metal-oxide-semiconductor field-effect (MOS-FET) transistors, while the second electronic switches 620 is a diode. The dissipative bi-pole 650 is realized by operating the third electronic switch 630 in the saturation region. The first and the third electronic switch 610, 630 are connected to and controlled by the electronic control unit 450, which is configured to operate the digital inlet valve 500 by the control circuit 600, as it will be disclosed in the following.

More in detail, the ECU 450 uses a peak and valley electric current control for driving the switching of the first electronic switch 610. According to the peak and valley electric current control, the ECU 450 drives, by a peak and valley control signal $r_{P\&V}$, the switching of the first electronic switch 610 from the closed position to the open position when the electric current value flowing through the control circuit 600 is equal to a predetermined high electric current value $I_H$ and it drives the switching of the first electronic switch 610 from the open position to the closed position when the electric current value flowing through the circuit is equal to a predetermined low electric current value $I_L$.

According to an aspect of the present disclosure, the ECU sets an electric current value to be supplied to the coil winding 545 as an average electric current value $I_{AVG}$ between the predetermined low and high electric current value $I_L$, $I_H$, determined by the following formula:

$$I_{AVG} = \left(\frac{I_H + I_L}{2}\right)$$

The predetermined high electric current value $I_H$ and the predetermined low electric current value $I_L$ are regulated by the ECU according to an angular position of the camshaft 135.

According to an embodiment of the present disclosure, the ECU 450 is configured to determine the fuel quantity to be delivered, by the high pressure pump 180 to the rail 170, as a function of an actual operating condition of the engine, and to determine, on the basis of the calculated required fuel quantity, an opening and a closing instant of the digital inlet valve 500 as a function of an angular position of the camshaft 135.

Figure 3:
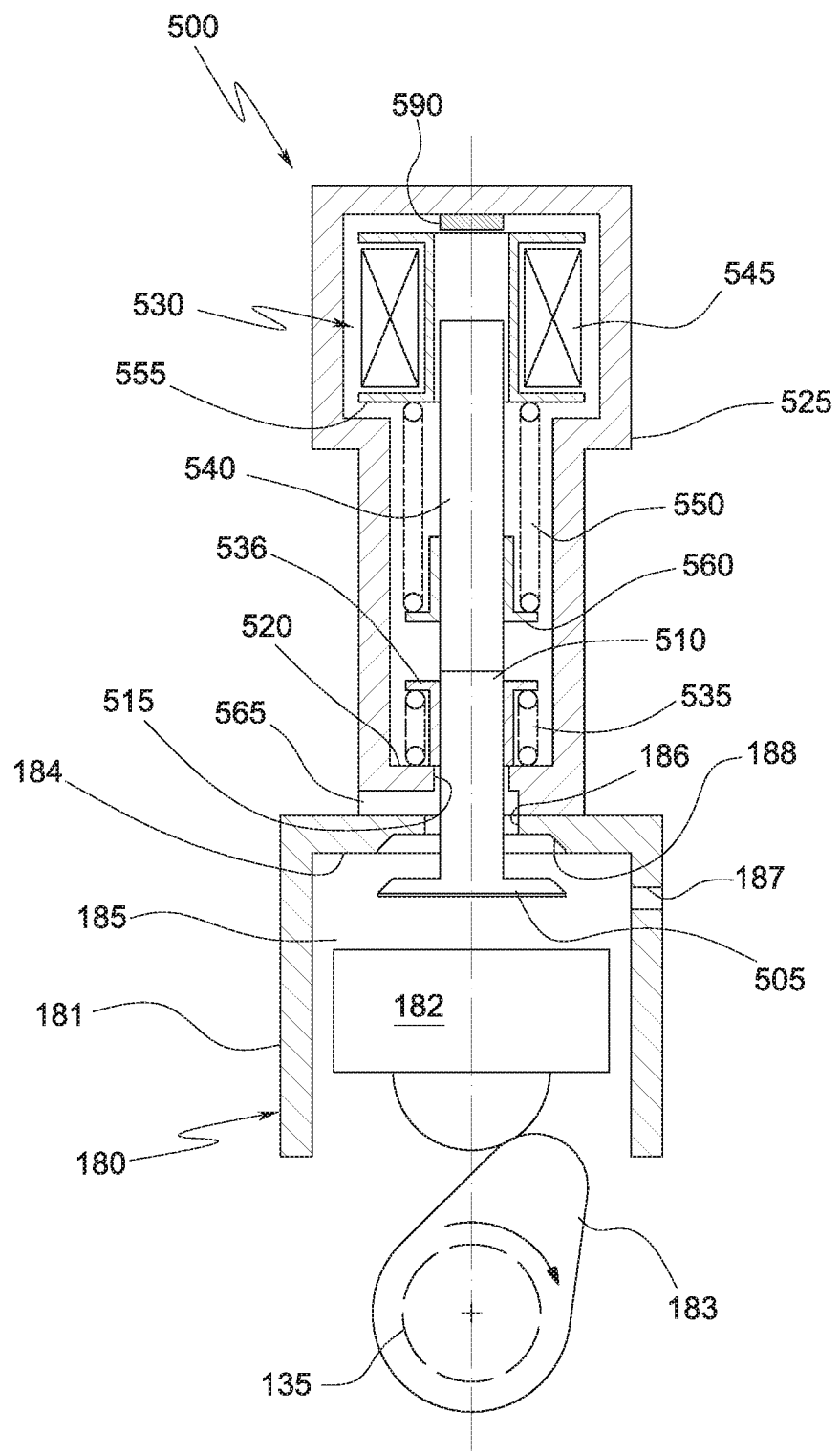
FIG. 3, 3a, 3b, 3c are schematic sections, according a vertical plane, of a high pressure pump and a digital inlet valve in different operating positions.

FIG. 3 shows the digital inlet valve 500 during a fuel suction phase of the high pressure pump 180, wherein the shutter is motionless. During the fuel suction phase the axial translation of plunger 182 generates a depression in the pumping chamber 185 which helps the flowing of the fuel within the pumping chamber 185. In this situation the ECU commands the third electronic switch 630 to stay in the third position 630c, wherein the second end terminal 580 is not connected to the ground pole 640, and it commands the first electronic switch 610 to stay in the open position so that the actuator is not activated and the elastic force of second compression spring 550 concurs to hold the shutter 505 in the open position.

When the angular position of the camshaft 135 corresponds to the determined closing instant of the digital inlet valve 500, the ECU 450, in order to allow the shutter translation from the open to the closed position, commands the periodical switching of the third electronic switch 630 from the third position 630c to the first position 630a. The second end terminal 580 is directly connected to the ground pole 640, and it commands the switching of the first electronic switch 610 between the open and the closed position connecting the coil winding 545 to the power source 605.

As told above, the ECU 450 drives the switching of the first electronic switch 610 from the closed position to the open position when the electric current value flowing through the control circuit 600 is equal to a predetermined high electric current value $I_H$ and it drives the switching of the first electronic switch 610 from the open position to the closed position when the electric current value flowing through the circuit is equal to a predetermined low electric current value $I_L$.

Figure 4A:
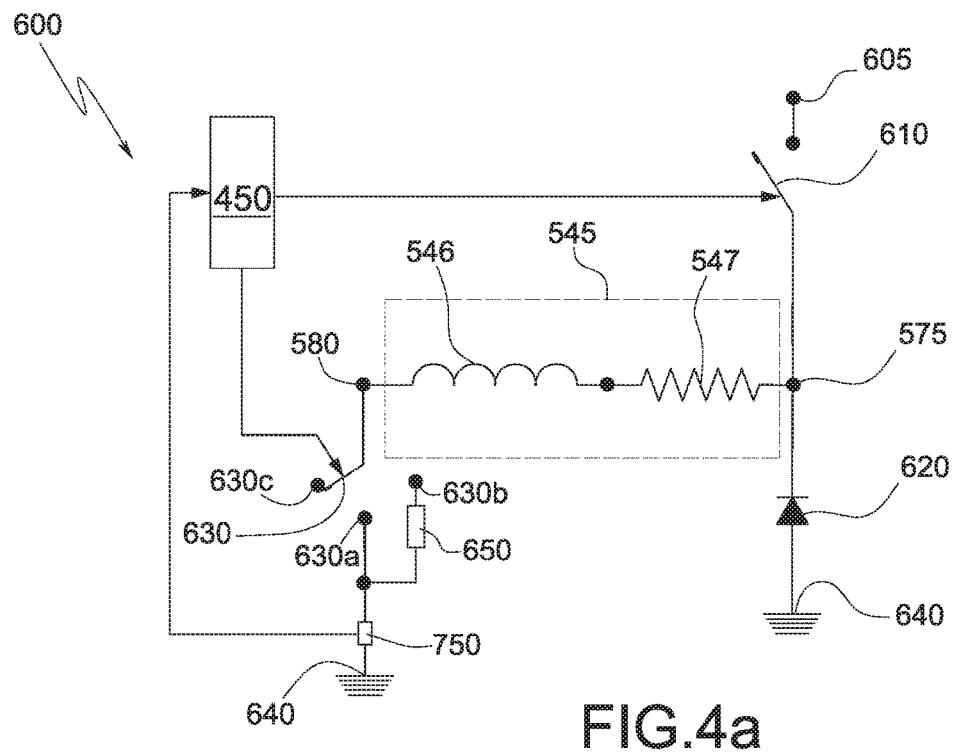
FIG. 4a, 4b illustrates a control circuit according to an embodiment of the present disclosure.

The driving of the first and third switch 610, 630 allows the flowing, through the circuit 600, of an electric current which value is monitored by the ECU 450 by a shunt resistor 750. In this situation, wherein the shutter 505 is still motionless, the coil winding 545 can be electrically represented by an inductor 546, having an inductance value L, in series with a resistor 547, having a resistance value R, as illustrated in FIG. 4a.

Figure 5A:
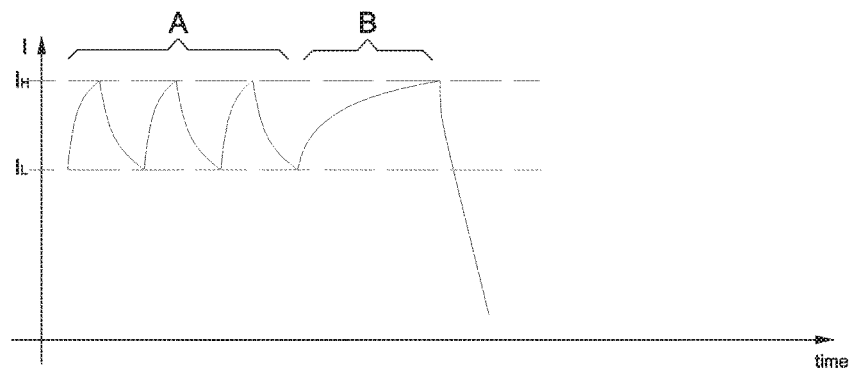
FIGS. 5a,5b,6a,6b show the variation over time of some signals used in an embodiment present disclosure.
Figure 5B:
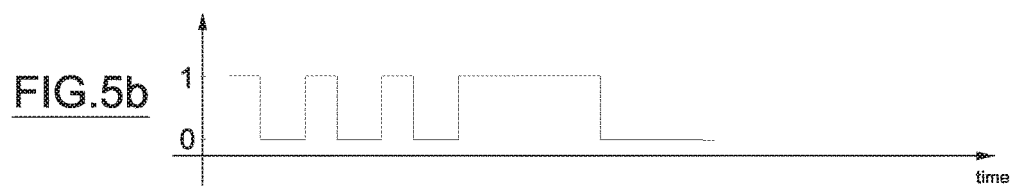
Figure 6A:
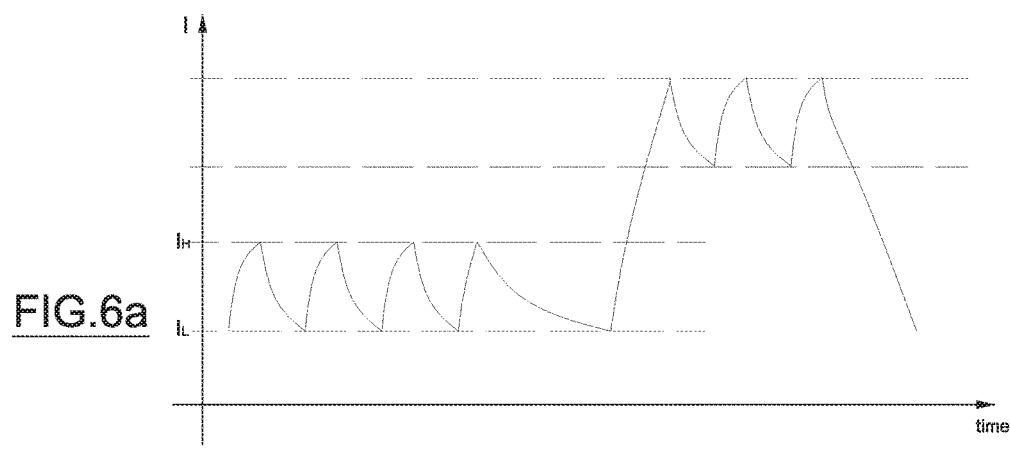
Figure 6B:
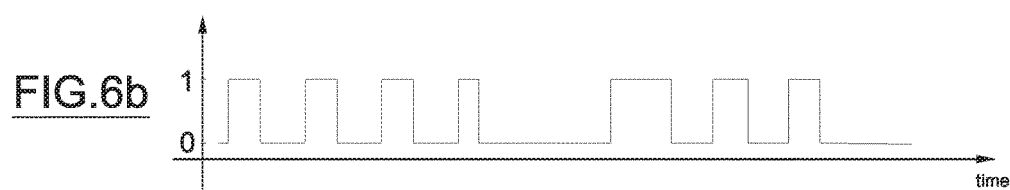
Figure 11:
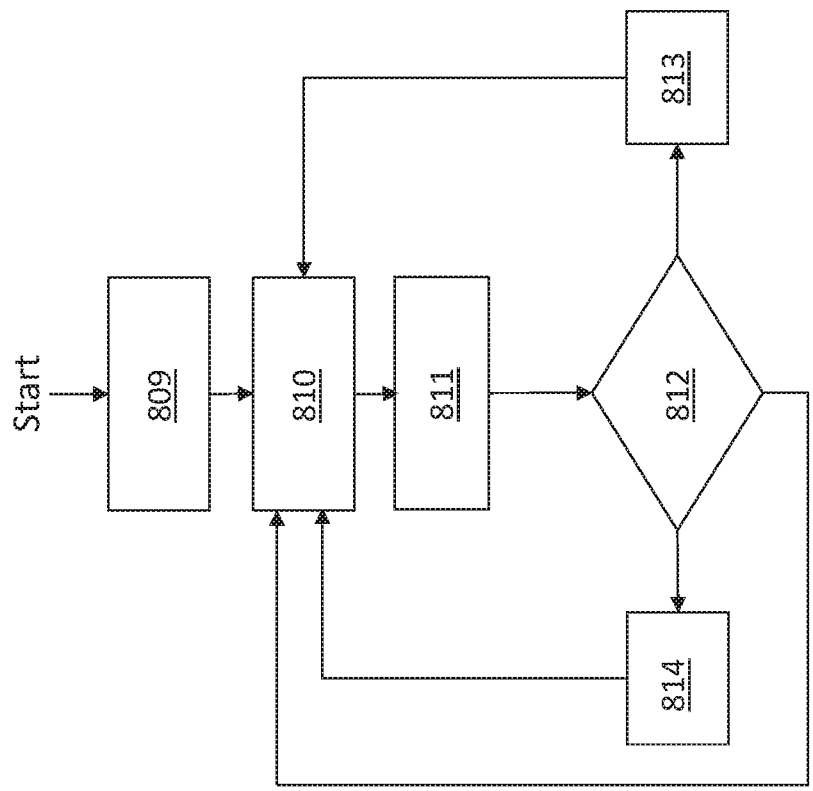
FIG. 11 is a flowchart representing in details an aspect of an embodiment of a method of operating a digital inlet valve.
Figure 10:
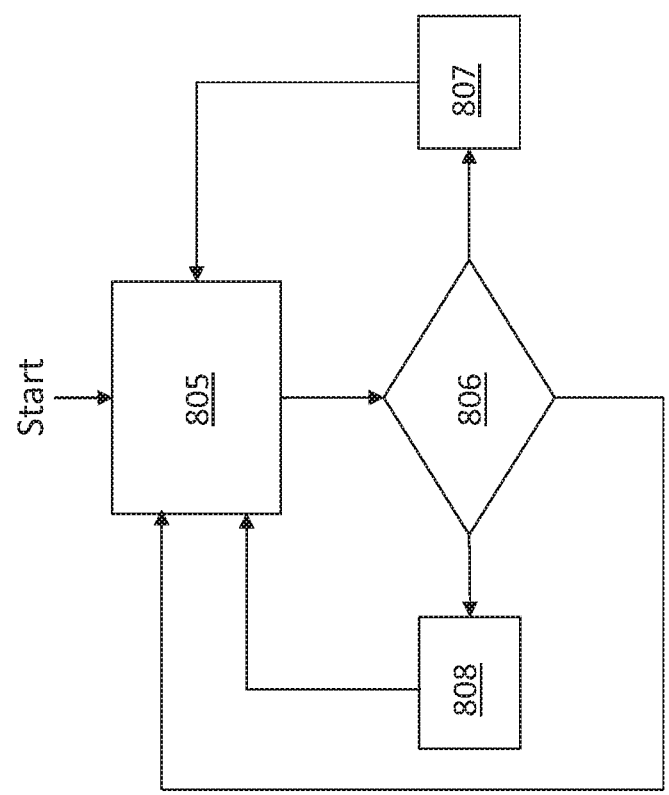
FIG. 10 is a flowchart representing in details an aspect of an embodiment of a method of operating a digital inlet valve.

The electric current flowing through the circuit has a waveform as indicate in the tract A of FIG. 5a. The flowing of an electric current through the coil winding 545 generates a magnetic field inducing a mechanical force on the needle of the actuator 530 in contrast to the elastic force exercised by the second compression spring 550.

Figure 3C:
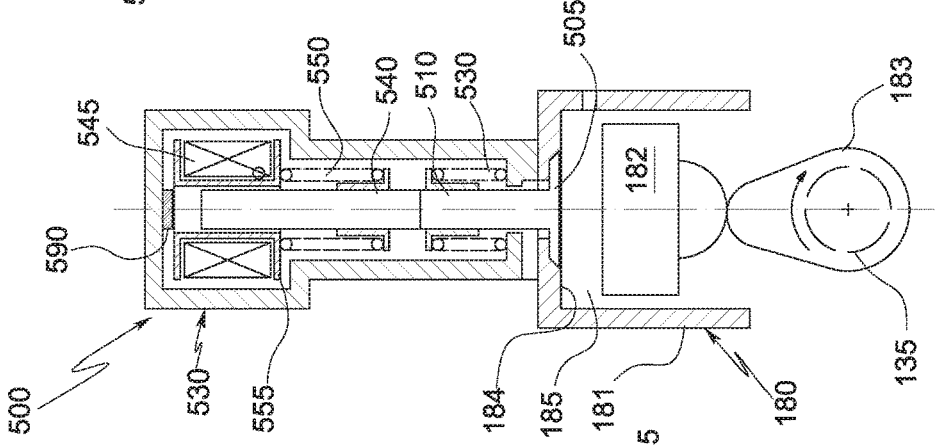
Figure 3B:
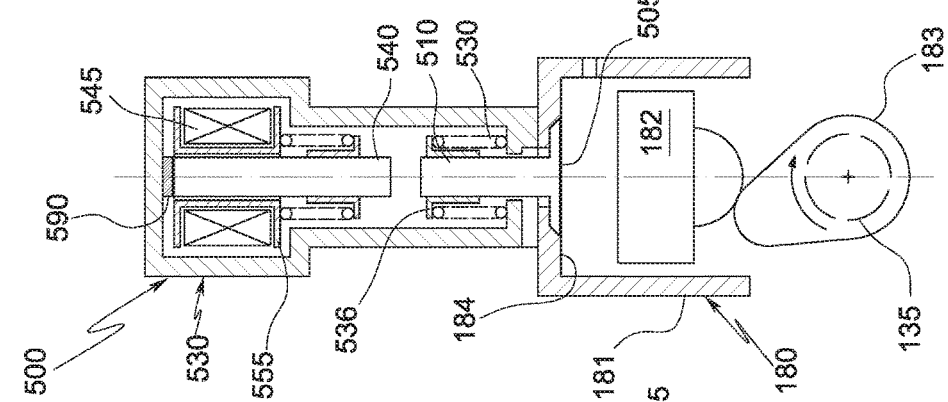
Figure 3A:
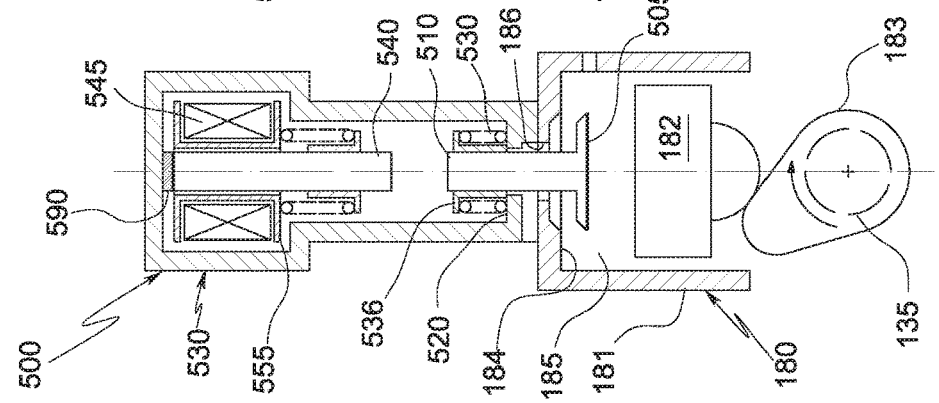

The value of the mechanical force acting on the needle 540 is a function of the electric current value flowing through the coil winding 545, therefore the ECU, during the closing phase of the shutter 505, regulates the predetermined high electric current and the predetermined low electric current at values $I_H, I_L$ that guarantee that the electric current flowing through the winding 545 generates a magnetic field inducing a mechanical force on the needle 540 sufficient to win the elastic force exercised by the second compression spring 550, so to allow an upwards translation of the needle, as shown in FIG. 3a.

Figure 4B:
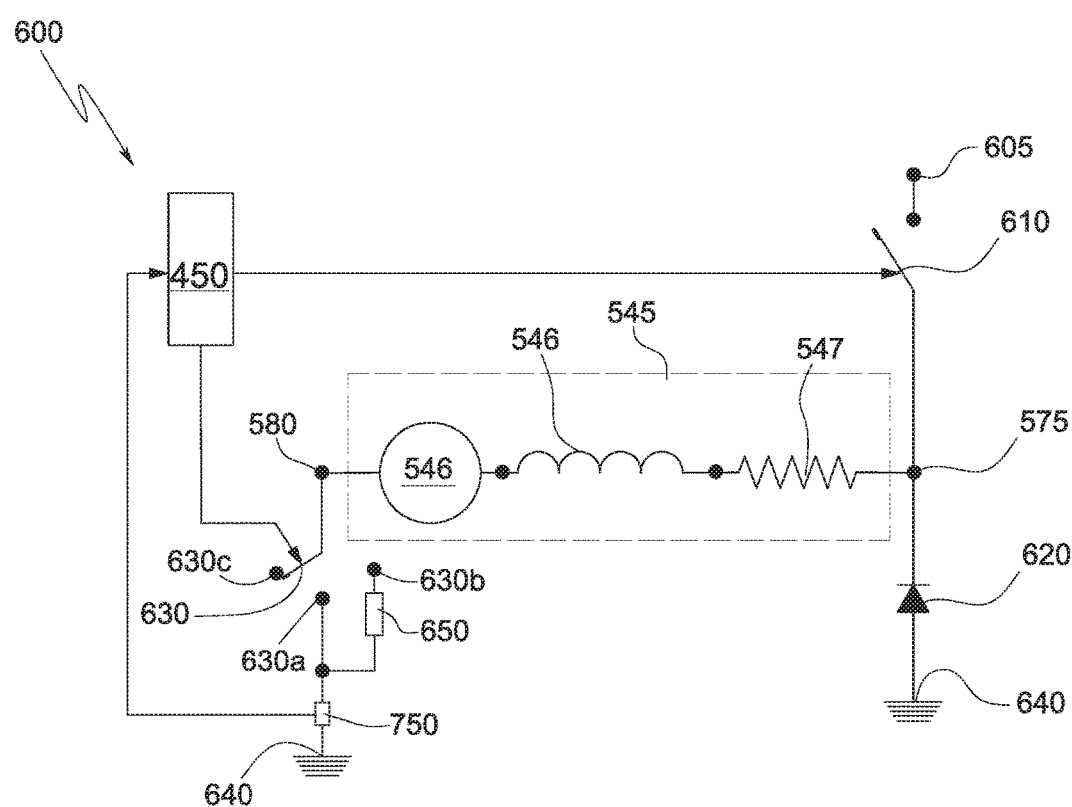

The upwards translation of the needle 540 generates a counter electromagnetic force opposing the needle translation. In this condition the coil winding 545 can be electrically represented by the inductor 546 in series with the resistor 547 and a counter electromagnetic force generator 548 as illustrated in FIG. 4b.

The counter electromagnetic force varies the conduction time (FIG. 5a tract B) of the first electronic switch 610, i.e. the time interval that the electric current takes to pass from the low electric current value $I_L$ to the high electric current value $I_H$, which is equal, for this embodiment of the present disclosure, to the time interval wherein the first electronic switch 610 is in the closed position, which can be calculated with the following formula:

$$T_{ON}^* = \frac{L}{R} \times \ln\left(\frac{V - E - RI_L}{V - E - RI_H}\right)$$

Wherein
L and R are respectively the inductance and the resistance values of the coil winding,
V is the voltage value of the power source,
$I_L$ and $I_H$ are the values respectively of the two predetermined low and high electric current, and
E is the value of the counter-electromotive force generated by the movement of the needle 540.

According to the present embodiment of the present disclosure, the ECU 450, which monitors the variation over time of the electric current flowing through the control circuit 600, determines also the conduction time value $T^*_{ON}$ of the first electronic switch 610, and uses the conduction time value $T^*_{ON}$ as a parameter indicative of a movement of the needle 540.

As soon as the conduction time value exceeds a predetermined value $T_{ON}$, the ECU 450 commands the switching of the first electronic switch 610 from the closed to the open position, interrupting the electric connection of the coil winding 540 with the power source 605, and it also commands the switching of the third switch 630 from the first position 630a to the second position 630b, wherein the second end terminal 580 is connected to the ground pole 640 by the dissipative bi-pole 650.

According to an aspect of the present disclosure the predetermined value $T_{ON}$ is equal to a conduction time of the first electronic switch 610 while the needle is motionless, and it is determined by ECU 450 monitoring the variation over time of the electric current flowing through the control circuit 600.

With reference to the control circuit 600 of FIG. 5a, the conduction time of the first electronic switch 610 while the needle is motionless can be calculated with the following formula:

$$T_{ON} = \frac{L}{R} \times \ln\left(\frac{V - RI_L}{V - RI_H}\right)$$

Wherein
L and R are respectively the inductance and the resistance values of the coil winding,
V is the voltage value of the power source, and
$I_L$ and $I_H$ are the values respectively of the two predetermined low and high electric current.

As a result of the dissipative bi-pole 650 the electric current flowing through the coil windings 545 run rapidly out, so as the electromagnetic force acting on the needle. In this way the translation speed of the needle is slowed down and the noise, caused by the impact of the needle against an upper end stop 590, is reduced. At the same time the shutter 505 translates in the closed position thanks to the action of the first compression spring 530 and to the action of the compression force due to the increasing pressure in the fuel pumping chamber 185 (FIG. 3b).

Afterwards the ECU 450 commands the switching of the third electronic switch 630 from the second position 630b to the first position 630a. The second end terminal 580 is directly connected to the ground pole 640, and it commands the switching of the first electronic switch 610 between the open and the closed position connecting the coil winding 545 to the power source 605. The ECU 540 also regulates the predetermined high electric current and the predetermined low electric current at values $I_H$, $I_L$ that guarantee that the electric current flowing through the coil winding 545 generates a magnetic field inducing a mechanical force on the needle 540 having a value lower than the elastic force value exercised by the second compression spring 550, allowing a downwards translation of the needle 540 towards the shutter 505 at a low speed, so to reduce the noise generated by the impact of the needle 540 against the shutter 505. (FIG. 3c)

Once the needle 540 abuts against the shutter 505 the ECU 450 commands the third electronic switch 630 to switch in the third position 630c. The second end terminal 580 is not connected to the ground pole 640, and it commands the first electronic switch 610 to switch in the open position so that the linear actuator 530 is not activated.

When the angular position of the camshaft 135 corresponds to the determined opening instant of the digital inlet valve 500, the ECU 450 commands the switching of the third electronic switch 630 from the third position 630c to the first position 630a. The second end terminal 580 is directly connected to the ground pole 640, and it commands the switching of the first electronic switch 610 between the open and the closed position connecting the coil winding to the power source 605.

The ECU 450 also regulates the predetermined high electric current $I_H$ and the predetermined low electric current $I_L$ at values that guarantee that the electric current flowing through the coil winding 545 generates a magnetic field inducing a mechanical force on the needle 540 having a value lower than the elastic force value exercised by the second compression spring 550, in order to exercise on the needle 540 a force supporting the shutter translation from the closed to the open position.

As soon as the shutter 505 and the needle 540 translate, a counter electromagnetic force, opposing the needle translation, is generated. The counter electromagnetic force varies the interdiction time value of the first electronic switch 610, and the ECU 450, as soon as the interdiction time value exceeds a predetermined value, regulates, by increasing, the predetermined high electric current and the predetermined low electric current at values $I_H, I_L$ that guarantee that the electric current flowing through the coil winding generates a magnetic field inducing a mechanical force on the needle 540 sufficient to counterbalance the elastic force exercised by the second compression spring 550. In this way the translation speed of the shutter 505 is slowed and the noise, caused by the impact of the spring guide 536 against the bottom wall 520 of the valve body 525, is reduced.

With reference to the circuit of FIG. 4b the interdiction time of the first electronic switch 610, i.e. the time interval wherein the first electronic switch is in the open position, can be determined with the following formula:

$$T^*_{OFF} = \frac{L}{R} \times \ln\left(\frac{E + RI_H}{E + RI_L}\right)$$

Wherein

L and R are respectively the inductance and the resistance values of the coil winding, $I_L$ and $I_H$ are the values the predetermined high and low electric current, and E is a value of the counter-electromotive force generated by the movement of the needle.

As soon as the interdiction time value exceeds a predetermined value $T_{OFF}$, the ECU operates the control circuit 600 according to the above disclosure.

According to an aspect of the present disclosure, the predetermined value $T_{OFF}$ is equal to an interdiction time of the first electronic switch 610 while the needle is motionless, is determined by ECU 450 monitoring the variation over time of the electric current flowing through the control circuit 600.

With reference to the control circuit 600 of FIG. 5a, the interdiction time of the first electronic switch 610 while the needle is motionless can be calculated with the following formula:

$$T_{OFF} = \frac{L}{R} \times \ln\left(\frac{I_H}{I_L}\right)$$

Wherein

L and R are respectively the inductance and the resistance values of the coil winding, $I_L$ and $I_H$ are the values the predetermined high and low electric current.

A different embodiment of the present disclosure provides that the ECU 450 controls, while the electric current is varying from the low electric value $I_L$ to the high electric value $I_H$, the switching of the first electronic switch 610, from the closed position to the open position, by a power with modulation signal (PWM) control signal $r_{PWM}$, which is superimposed over the peak and valley control signal $r_{P\&V}$ (FIG. 8). Accordingly, the conduction time of the first electronic switch 610, i.e. the time interval that the electric current takes to pass from the low electric current value $I_L$ to the high electric current value $I_H$, can be calculated with the following formula:

$$T^*_{ON} = \frac{L}{R} \times \ln\left(\frac{D_{PWM}V - E - RI_L}{D_{PWM}V - E - RI_H}\right)$$

Wherein

L and R are respectively the inductance and the resistance values of the coil winding, V is the voltage value of the power source, $I_L$ and $I_H$ are the values respectively of the two predetermined low and high electric current, E is the value of the counter-electromotive force generated by the movement of the needle 540, and $D_{PWM}$ is a duty-cycle of the PWM control signal $r_{PWM}$.

The duty cycle of the PWM control signal $r_{PWM}$ can be calculated by the formula:

$$D_{PWM} = \frac{1}{T_{PWM}} \times \int_0^{T_{PWM}} r_{PWM} dt$$

Wherein $T_{PWM}$ is a period of the PWM control signal $r_{PWM}$.

While the needle is motionless, the conduction time of the first electronic switch 610 can be calculated with the following formula:

$$T_{ON} = \frac{L}{R} \times \ln\left(\frac{D_{PWM}V - RI_L}{D_{PWM}V - RI_H}\right)$$

Wherein

L and R are respectively the inductance and the resistance values of the coil winding, V is the voltage value of the power source, $I_L$ and $I_H$ are the values respectively of the two predetermined low and high electric current, and $D_{PWM}$ is a duty-cycle of the PWM signal $r_{PWM}$.

This solution allows a more precise control on the translation speed of the needle 540, consequently the impact noise, caused by the impact of the needle against the upper end stop 590, is further reduced.

According to a preferred aspect of the present disclosure, the electric current supplied to the coil winding 545 is set by the ECU 450 according to an auto-calibration strategy (FIG. 9). The auto-calibration strategy provides for setting (block 800) a first electric current value $I_{MIN}$, that guarantees the closure of the digital inlet valve 500, and a second electric current value $I_{MAX}$, greater than the first electric current value $I_{MIN}$, that guarantees the closure of the digital inlet valve 500 during the first rising phase of the electric current flowing through the coil winding 545. Then the ECU, at first, activates the switching of the first electronic switch 610, for supplying the second electric current value $I_{MAX}$ to the coil windings 545 and it monitors a translation of the needle 540 (block 801) by monitoring a parameter indicative of a movement of the needle 540, such as for instance the conduction or the interdiction time value $T^*_{ON}$ or $T^*_{OFF}$. If no translation of the needle 540 is detected, the ECU 450 compares (block 802) the second electric current value $I_{MAX}$ to the first electric current value $I_{MIN}$.

If the second electric current value $I_{MAX}$ is lower than the first electric current value $I_{MIN}$, then the ECU 450 stores (block 804) the second electric current value $I_{MAX}$ and drives the switching the electronic switch 610 for supplying the second electric current value $I_{MAX}$ to the coil windings 545. If the second electric current value $I_{MAX}$ is equal or greater than the first electric current value $I_{MIN}$, then the ECU 450 sets (block 803) a new reduced electric current value, reducing the applied electric current value of a predetermined quantity δi. Then the ECU 450 drives the switching the electronic switch 610 for supplying the new reduced electric current value to the coil windings 545.

The ECU 450 repeats this strategy until a translation of the needle 540 is detected.

When a translation of the needle 540 is detected the ECU 450 stores (block 804) the reduced second electric current value $I_{MAX}$ and drives the switching the electronic switch 610 for supplying the new reduced electric current value to the coil windings 545. This auto-calibration strategy allows regulating the electric current supplied to the winding coil 545 as a function of the spring tolerance and aging.

According to a different preferred aspect of the present disclosure, during a closing instant of the shutter 505, the ECU 450 regulates the electric current supplied to the coil winding 545 according to the following procedure. The ECU 450 sets an electric current value $I_{AVG}$ equal to the average value between the predetermined low and high electric current values $I_L$, $I_H$, the average value being determined by the following formula:

$$I_{AVG} = \left(\frac{I_H + I_L}{2}\right)$$

Then the ECU 450 activates (block 805) the switching of the first electronic switch 610 by the peak and valley electric current control, which, as disclosed above, provides for switching the first electronic switch 610 from the closed position to the open position when the electric current value flowing through coil winding 545 is equal to a predetermined high electric current value $I_H$ and switching the first electronic switch 610 from the open position to the closed position when the electric current value flowing through the circuit is equal to a predetermined low electric current value $I_L$.

Then, the ECU 450 monitors how many open/close cycles (block 806) of the first electronic switch 610 occur before detecting a translation of the needle 540. As told above a translation of the needle 540 is detected by the ECU 450 by monitoring a parameter indicative of a movement of the needle 540, such as for instance the conduction time value $T^*_{ON}$ or $T^*_{OFF}$. If the movement of the needle occurs after a predetermined open/close cycle of the first electronic switch 610, the ECU 450 (block 807) increases the average electric current value $I_{AVG}$ of a predetermined quantity δi, so to allow a flowing through the coil winding 545 of the increased electric current $I_{AVG}$+δi The ECU 450 regulates also the values $I_L$, $I_H$, respectively of the predetermined low and high electric currents, which are determined by:

$$I_H = (I_{AVG} + \delta_i + \Delta_i)$$

$$I_L = (I_{AVG} + \delta_i - \Delta_i)$$

Wherein ΔI is a predetermined electric current quantity which value is provided by the manufacturer of the electric switch 610. If the movement of the needle occurs before the predetermined open/close cycle of the first electronic switch 610, the ECU 450 (block 808) decreases the average electric current value $I_{AVG}$ of the predetermined quantity δis to allow a flowing through the coil winding 545 of the decreased electric current $I_{AVG}$−δi.

Also in this case, the ECU 450 regulates also the values $I_L$, $I_H$, respectively of the predetermined low and high electric currents, which are determined by:

$$I_H = (I_{AVG} - \delta i + \Delta I)$$

$$I_L = (I_{AVG} - \delta i - \Delta I)$$

Wherein ΔI is a predetermined electric current quantity which value is provided by the manufacturer of the electric switch 610. If the movement of the needle occurs during the predetermined open/close cycle of the first electronic switch 610, the ECU 450 leaves unchanged the average electric current value $I_{AVG}$ and the values $I_L$, $I_H$, of the predetermined low and high electric currents. According to the present aspect of the present disclosure the predetermined open/close cycle of the first electronic switch 610 is set as the third open/close cycle.

According to a second preferred aspect of the present disclosure, during an opening instant of the shutter 505, the ECU 450 regulates the electric current to the coil winding 545 according to the following procedure. The ECU 450 sets (block 809) an electric current having a value $I_{AVG}$ equal to the average value between the predetermined low and high electric current values $I_L$, $I_H$, the average value being determined by the following formula:

$$I_{AVG} = \left(\frac{I_H + I_L}{2}\right)$$

The ECU 450 (block 810) activates the switching of the first electronic switch 610 by the peak and valley electric current control, which, as disclosed above, provides for switching the first electronic switch 610 from the closed position to the open position when the electric current value flowing through the coil winding 545 is equal to a predetermined high electric current value $I_H$ and switching the first electronic switch 610 from the open position to the closed position when the electric current value flowing through the circuit is equal to a predetermined low electric current value $I_L$.

Then, the ECU monitors the interdiction time $T_{OFF}$ during a predetermined number of open/close cycles of the first electronic switch 610, and it stores a maximum value $T_{OFF,MAX}$ of the interdiction time among those monitored (block 811). The ECU 450 compares the maximum value $T_{OFF,MAX}$ of the interdiction time to a reference predetermined value $T^*_{OFF,REF}$ (block 812). If the maximum value $T_{OFF,MAX}$ of the interdiction time is greater than a reference predetermined value $T^*_{OFF,REF}$ then the ECU 450 (block 813) increases the average electric current value $I_{AVG}$ of the predetermined quantity δi, so to allow a flowing through the coil winding 545 of the increased electric current $I_{AVG}+\delta i$ (block 810).

Also in this case, the ECU 450 regulates the values $I_L$, $I_H$, respectively of the predetermined low and high electric currents, which are determined by:

$$I_H=(I_{AVG}+\delta i+\Delta I)$$

$$I_L=(I_{AVG}+\delta i-\Delta I)$$

Wherein ΔI is a predetermined electric current quantity which value is provided by the manufacturer of the electric switch 610.

If the maximum value $T^*_{OFF,MAX}$ of the interdiction time is less than the reference predetermined value $T^*_{OFF,REF}$ then the ECU 450 (block 814) decreases the average electric current value $I_{AVG}$ of a predetermined quantity δi, so to allow a flowing through the coil winding 545 of the decreased electric current $I_{AVG}-\delta i$ to the coil winding 545 (block 810).

The ECU 450 regulates also the values $I_L$, $I_H$, respectively of the predetermined low and high electric currents, which are determined by:

$$I_H=(I_{AVG}-\delta i+\Delta I)$$

$$I_L=(I_{AVG}-\delta i-\Delta I)$$

Wherein ΔI is a predetermined electric current quantity which value is provided by the manufacturer of the electric switch 610. If the maximum value $T^*_{OFF,MAX}$ of the interdiction time is equal than the reference predetermined value $T^*_{OFF,REF}$ then the ECU 450 leaves unchanged the average electric current value $I_{AVG}$ and the values $I_L$, $I_H$, of the predetermined low and high electric currents.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method of operating a digital inlet valve having a shutter moveable between a closed and an open position and actuated by a linear electromagnetic actuator including a movable needle located inside a coil winding connected to a power source by a first electronic switch, the method comprising:
    a) supplying an electric current to the coil winding by driving the switching of the first electronic switch using a peak and valley current control signal, wherein the first electronic switch is switched from a closed position to an open position when the electric current value flowing through a control circuit is equal to a predetermined high electric current value $I_H$ and is switched from the open position to the closed position when the electric current value flowing through the control circuit is equal to a predetermined low electric current value $I_L$;
    b) monitoring a parameter indicative of a movement of the needle; and
    c) adjusting the electric current supply when the monitored parameter exceeds a predetermined value to regulate a translation speed of the actuator needle and the valve shuttle for slowing the translation speed near an end stop of the digital inlet valve.

2. The method according to claim 1, wherein the parameter indicative of a movement of the needle is a conduction time of the first electronic switch connected to the power supply.

3. The method according to claim 2, further comprising adjusting the electric current supply by:
    d) interrupting the electric current supply; and
    e) connecting the coil winding to a dissipative bi-pole for discharging the electric current from the coil winding.

4. The method according to claim 1, further comprising supplying the electric current to the coil winding during a closing instant of the shutter comprises:
    f) activating a switching of the first electronic switch for supplying an electric current having a value $I_{AVG}$ equal to the average value between predetermined low and high electric current values to the winding; and
    g) adjusting an electric current flowing through the winding and the predetermined low and high electric current values $I_L$, $I_H$ until a translation of the needle is detected during a predetermined open/close cycle of the first electronic switch.

5. The method according to claim 4, further comprising adjusting the electric current flowing through the winding and the predetermined low and high electric current values if a translation of the needle is detected after the predetermined open/close cycle by increasing the electric current flowing through the winding and the predetermined low and high electric current values by a predetermined quantity until the translation of the needle is detected during the predetermined open/close cycle.

6. The method according to claim 4, further comprising adjusting the electric current flowing through the winding and the predetermined low and high electric current values if a translation of the needle is detected before the predetermined open/close cycle by decreasing the electric current flowing through the winding and the predetermined low and high electric current values by a predetermined quantity until the translation of the needle is detected during the predetermined open/close cycle.

7. The method according to claim 1, wherein the parameter indicative of a movement of the needle is an interdiction time of the first electronic switch.

8. The method according to claim 7, wherein further comprising adjusting the electric current by increasing the supplied electric current value.

9. The method according to claim 7, further comprising supplying an electric current to the coil winding during an opening instant of the shutter by:
    h) switching the first electronic switch for supplying the electric current having a value equal to an average value between predetermined low and high electric current values to the winding;
    i) monitoring the interdiction time during a predetermined number of open/close cycles of the first electronic switch;
    j) storing a maximum value of the interdiction time among those monitored; and
    k) adjusting an electric current flowing through the winding and regulating the predetermined low and high electric current values until the maximum value of the interdiction time is equal to a predetermined reference value.

10. The method according to claim 9, further comprising adjusting an electric current flowing through the winding and the predetermined low and high electric current values if the maximum value of the interdiction time is greater than the reference predetermined value by increasing the electric current flowing through the winding a predetermined quantity until the maximum value of the interdiction time is equal to the reference predetermined value.

11. The method according to claim 9, further comprising adjusting an electric current flowing through the winding and the predetermined low and high electric current values if the maximum value of the interdiction time is smaller than the reference predetermined value by decreasing the electric current flowing through the winding by a predetermined quantity until the maximum value of the interdiction time is equal to the reference predetermined value.

12. The method according to claim 1, further comprising supplying of an electric current to the coil winding by:
l) setting a first and a second electric current values;
m) supplying to the coil winding the second electric current value by switching the first electronic switch;
n) monitoring a translation of the needle;
o) reducing the second electric current value a predetermined quantity if no translation of the needle is detected; and
p) repeating m) and o) until a translation of the needle is detected or the reduced second electric current value is smaller than the first electric current value.

13. The method according to claim 1, further comprising supplying an electric current to the coil winding by switching the electronic switch with a peak and valley control signal.

14. The method according to claim 13, further comprising supplying an electric current to the coil winding by switching the electronic switch by superimposing a power with modulation signal to the peak and valley control signal.

15. A digital inlet valve comprising:
a shutter moveable between a closed and an open position;
a linear electromagnetic actuator configured to actuate the shutter, the linear electromagnetic actuator including a movable needle located inside a coil winding having a first and a second end terminal; and
a) a control circuit including a first end terminal electrically connected to a power source by a first electronic switch and to a ground pole by a second electronic switch, and a second end terminal electrically connected to a third electronic switch configured to switch between a first position wherein the second end terminal is directly connected to the ground pole, a second position wherein the second end terminal is connected to the ground pole by a dissipative bi-pole, and a third position wherein the second end terminal is not connected to the ground pole, the first and the third electronic switches being connected to an electronic control unit configured to command the first electronic switch to an open position disconnecting the electric power source and to command the third electronic switch in the second position when a conduction time of the first electronic switch exceeds a predetermined value to regulate a translation speed of the actuator needle and the valve shuttle for slowing the translation speed near an end stop of the digital inlet valve;
wherein the electronic control unit is configured to: (a) supplying an electric current to the coil winding by driving the switching of the first electronic switch using a peak and valley current control signal, wherein the first electronic switch is switched from a closed position to open position when the electric current value flowing through a control circuit is equal to a predetermined high electric current value $I_H$ and is switched from the open position to the closed position when the electric current value flowing through the control circuit is equal to a predetermined low electric current value $I_L$, (b) monitor a parameter indicative of a movement of the needle, and (c) adjust the electric current supply when the monitored parameter exceeds a predetermined value to regulate a translation speed of the actuator needle and the valve shuttle for slowing the translation speed near an end stop of the digital inlet valve.

16. The digital inlet valve according to claim 15, wherein the electronic control unit is further configured to drive the switching of the first electronic switch using a pulse width modulation signal superimposed over the peak and valley current control signal when the electric current is varied from the predetermined low electric current value $I_L$ to the predetermined high electric current value $I_H$.

17. The method according to claim 1, wherein the electric current is supplied to the coil winding by driving the switching of the first electronic switch using a pulse width modulation signal superimposed over the peak and valley current control signal when the electric current is varied from the predetermined low electric current value $I_L$ to the predetermined high electric current value $I_H$.

* * * * *

UNITED STATES PATENT AND TRADEMARK OFFICE
CERTIFICATE OF CORRECTION

PATENT NO.         : 10,428,970 B2
APPLICATION NO.    : 15/299244
DATED              : October 1, 2019
INVENTOR(S)        : Stefano Nieddu, Andrea Mollar and Tiziano Sorrentino Page 1 of 1

It is certified that error appears in the above-identified patent and that said Letters Patent is hereby corrected as shown below:

On the Title Page

Item (72), INVENTOR(S) should read:
Stefano Nieddu (Turin, Italy)
Andrea Mollar (La Loggia, Italy)
Tiziano Sorrentino (Turin, Italy)
Tiziana Belvedere (Torino, Italy)

Signed and Sealed this
Seventeenth Day of March, 2020

Andrei Iancu
*Director of the United States Patent and Trademark Office*